C. J. Hauck,
Oil-Can.
No. 75,904.         Patented Mar. 24, 1868.
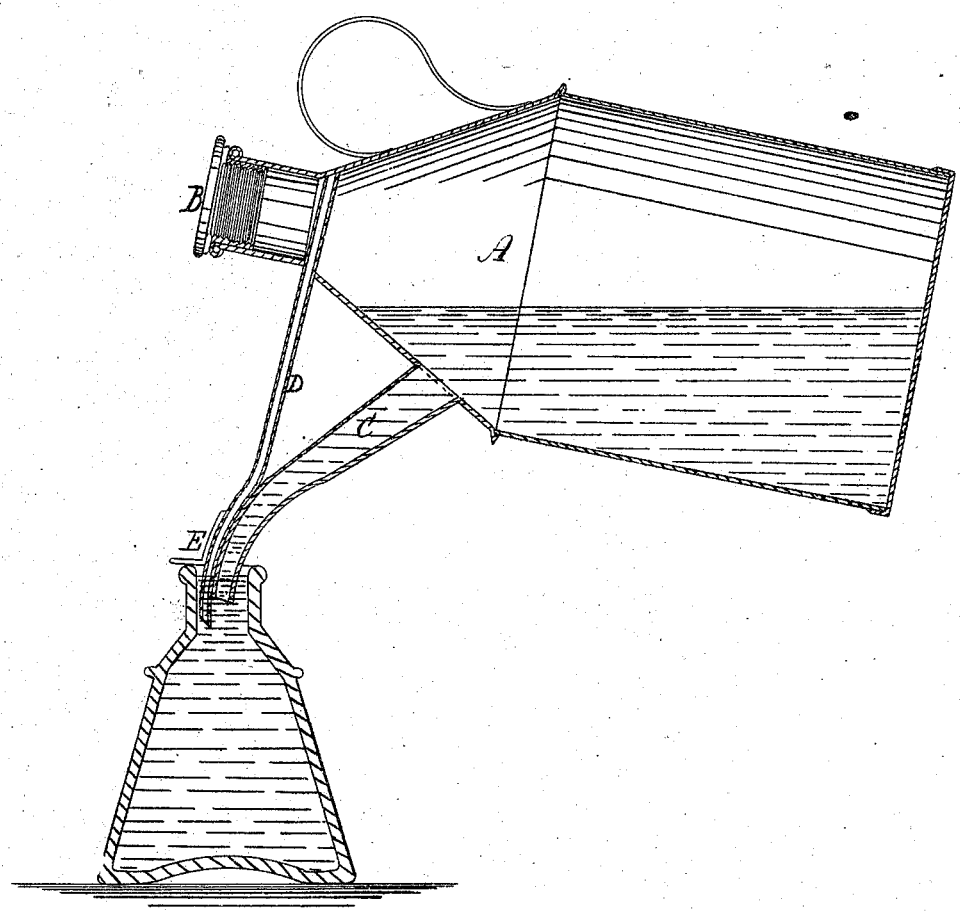
Witnesses.
John C. Potter
Gustav Berg
Inventor.
Chas. J. Hauck
per
Van Santvoord & Hauff
Attys

United States Patent Office.

CHARLES J. HAUCK, OF WILLIAMSBURG, NEW YORK.

Letters Patent No. 75,904, dated March 24, 1868.

IMPROVEMENT IN OIL-CANS.

*The Schedule referred to in these Letters Patent and making part of the same.*

TO ALL WHOM IT MAY CONCERN:

Be it known that I, CHARLES J. HAUCK, of 26 Stagg street, Williamsburg, in the county of Kings, in the State of New York, have invented a new and useful Improvement in Oil-Fillers; and I do hereby declare that the following is a full, clear, and exact description thereof, which will enable those skilled in the art to make and use the same, reference being had to the accompanying drawing, which represents a section of this invention.

This invention relates to certain improvements in that class of oil-fillers which are provided with a vent-tube and with a hermetically-closing stopper, said vent-tube being so arranged that, when the oil in the vessel to be filled rises to a certain level, the supply of air to the filler is cut off, and the discharge of the oil from said filler stops automatically.

In cans or fillers of this kind, as heretofore constructed, such, for instance, as that described in Letters Patent granted to Thomas K. Anderson, October 15, 1861, (33,471,) the vent-tube terminates inside of the tip or spout, and in pouring oil from the filler into another vessel the discharge from the filler does not stop in time to prevent an overflow, unless the spout is inserted to a considerable depth into the vessel to be filled. This difficulty I have overcome by extending the vent-tube to some distance beyond the spout, so that the supply of air to the filler is cut off in time to prevent an overflow. I have also applied a stop or gauge, either to the vent-tube or to the spout, in such a manner that the distance to which the spout of the filler has to be introduced into the vessel to be filled can be readily determined, and the manipulation of my filler is rendered safe and easy, even in the hands of inexperienced and careless persons.

A represents my filler, which is made of tinned sheet iron, or any other suitable material, in any desirable form or shape. It is provided with a hermetically-closing stopper, B, and with a spout, C, and vent-tube D, as clearly shown in the drawing. The outer end of said vent-tube extends some distance, say, three-eighths of an inch, (more or less,) beyond the tip of the spout, so that the liquid, rising in the vessel to be filled, will cut off the supply of air to the filler a little before the discharge of the liquid from the filler stops, and an overflow or spilling of the liquid is effectually prevented.

From the vent-tube or spout extends a gauge or stop, E, which is placed on the edge of the vessel to be filled, and determines the distance to which the spout and vent-tube have to be inserted into the vessel to be filled, so as to cut off the supply of air to the filler in time to prevent an overflow.

If desired, this gauge can be made adjustable, though, in practice, I prefer to attach it rigidly either to the spout or to the vent-tube.

By the application of this gauge my filler can be safely entrusted to inexperienced and careless persons, since it will effectually prevent an overflow or spilling of the liquid from the vessel to be filled, during the operation of filling, provided the precaution is taken to bring the gauge down upon the neck or edge of the vessel to be filled.

I do not claim as my invention the arrangement of a vent-tube over the spout of a hermetically-closed vessel, neither do I claim anything shown and described in the patent of Thomas K. Anderson, dated October 15, 1861.

What I claim as new, and desire to secure by Letters Patent, is—

The arrangement of the gauge or stop E, in combination with the vent-tube D and spout C of a hermetically-closed can, A, substantially as and for the purpose described.

C. J. HAUCK.

Witnesses:
  W. HAUFF,
  JOHN C. POLLER.